Sept. 2, 1958　　　W. J. McFARLAND　　　2,849,743
COLLAPSIBLE DUST PAN ATTACHMENT
Filed Jan. 17, 1958　　　　　　　　　2 Sheets-Sheet 1
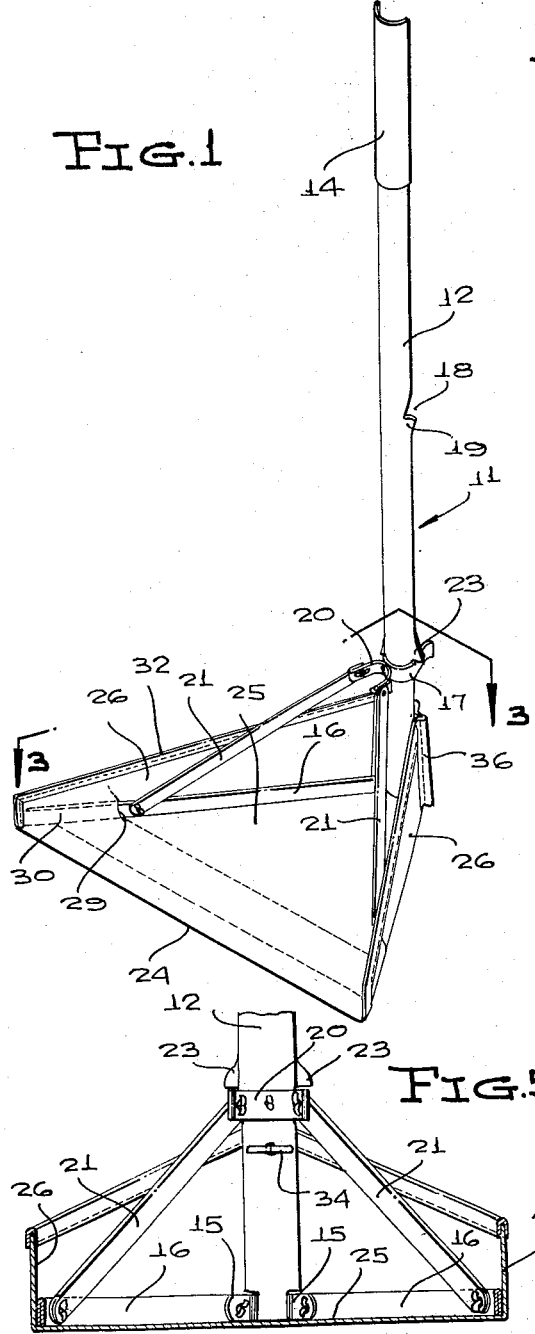
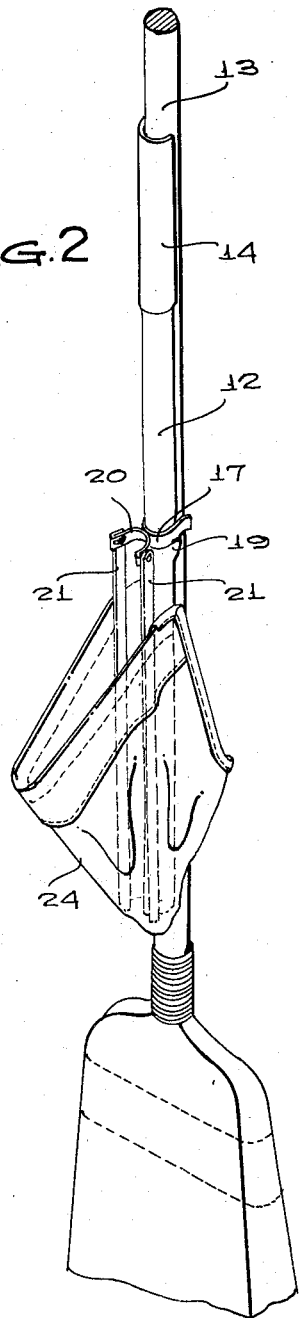
INVENTOR.
WALTER J. McFARLAND
BY
McMorrow, Berman + Davidson
ATTORNEYS Sept. 2, 1958 W. J. McFARLAND 2,849,743
COLLAPSIBLE DUST PAN ATTACHMENT
Filed Jan. 17, 1958 2 Sheets-Sheet 2
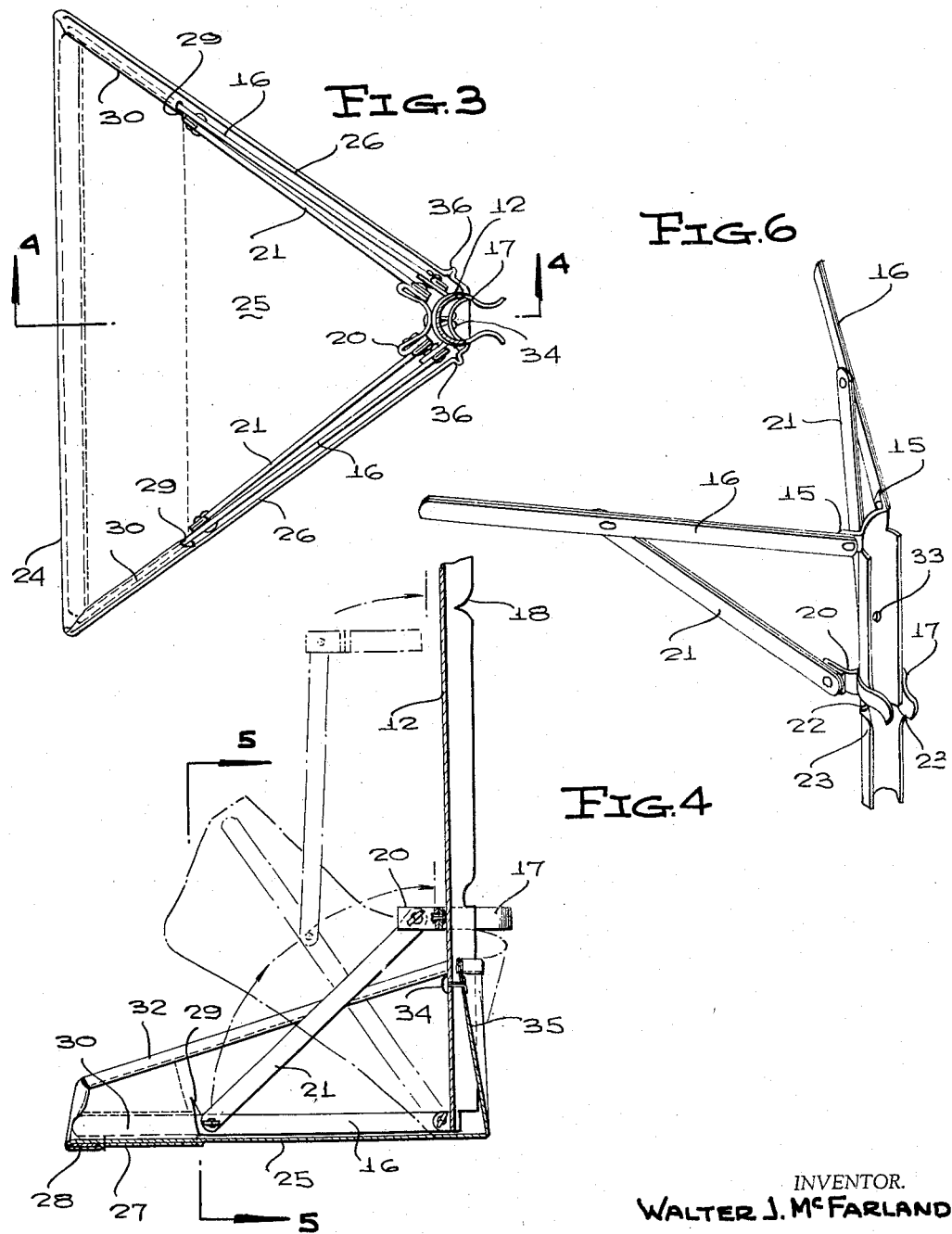
INVENTOR.
WALTER J. McFARLAND
BY
McMorrow, Berman & Davidson
ATTORNEYS

United States Patent Office 2,849,743
Patented Sept. 2, 1958

2,849,743

COLLAPSIBLE DUST PAN ATTACHMENT

Walter J. McFarland, Dorchester, Mass.

Application January 17, 1958, Serial No. 709,640

3 Claims. (Cl. 15—257.2)

This invention relates to dust pans, and more particularly to a foldable dust pan attachment for a broom.

A main object of the invention is to provide a novel and improved foldable dust pan attachment for a broom, said attachment being simple in construction, being easy to install on a broom, and being foldable to a very compact size so that it does not interfere with the normal use of the broom.

A further object of the invention is to provide an improved foldable dust pan attachment for a broom, said attachment involving inexpensive components, being durable in construction, and being very easy to disengage from the broom and to unfold to its operative position whenever its use is required.

Further objects and advantages of the invention will become apparent from the following description and claims, and from the accompanying drawings, wherein:

Figure 1 is a perspective view of an improved dust pan attachment according to the present invention, shown unfolded and ready for use.

Figure 2 is a perspective view showing the dust pan attachment of Figure 1 in folded position and mounted on a broom in a manner to allow the broom to be employed in its normal way.

Figure 3 is a horizontal cross-sectional view taken on the line 3—3 of Figure 1.

Figure 4 is a vertical cross-sectional view taken on the line 4—4 of Figure 3.

Figure 5 is a fragmentary vertical cross-sectional view taken on the line 5—5 of Figure 4.

Figure 6 is a perspective view showing the lower portion of the foldable dust pan attachment of Figures 1 to 5 with the receptacle member thereof removed and in inverted position.

Referring to the drawings, 11 generally designates an improved foldable dust pan attachment according to this invention, said attachment comprising an elongated concave rigid handle member 12 shaped to fit against a broom handle, for example, the broom handle 13 shown in Figure 2. The concave handle 12 is provided at its top end with a thickened portion 14 intended to be employed as a hand grip element for holding the dust pan when in use.

As shown, the concave handle 12 has its convex surface facing forwardly. The lower end of said handle 12 is formed with a pair of forwardly diverging lugs 15, 15 (Fig. 6), and pivoted to said lugs are respective rigid arms 16, 16, said arms being rotatable in respective vertical planes parallel to the planes of the lugs 15, 15.

Designated at 17 is a generally U-shaped spring clip member which is clampingly engageable on the handle 12 and which is provided with spring arms of sufficient length to clampingly engage with a broom handle 13 on which the concave elongated handle 12 is engaged, and shown in Figure 2, whereby to support the dust pan device 11 in its folded position when not in use.

The respective sides of the elongated handle 12 are notched away at 18, to receive the respective arms of the spring clip 17, the side portions of the handle being formed with outwardly projecting lugs 19 subjacent the notches 18 to at times lockingly engage with the spring clip 17 and to support said spring clip in a manner to hold the dust pan attachment folded, as shown in Figure 2, and as will be presently explained.

Secured to the bight portion of the spring clip 17 is a U-shaped bracket member 20, and connecting the respective arms of said bracket member 20 to the intermediate portions of the respective arms 16, 16 are respective link bars 21, 21.

The lower portion of the handle 12 is formed as respective sides with notches 22, to provide clearance for the arms of the spring clip 17 when the spring clip is engaged with said lower portion of the handle 12, the side portions of the handle being formed immediately above the notches 22 with respective outwardly projecting locking lugs 23, 23 (Fig. 5) to lock the spring clip 17 against upward movement when the device is in its unfolded position, shown in Figure 1.

Designated at 24 is a receptacle comprising a body of flexible sheet material, such as fabric, sheet plastic, or any other suitable sheet material of durable characteristics, the receptacle 24 comprising a generally triangular bottom wall 25 and generally triangular side walls 26, 26, arising from the side margins of the bottom wall, the side walls increasing in height from the end margin of the bottom wall remote from the apex margin thereof to the apex margin of the bottom wall and merging behind the lower portion of the handle 12. As shown, the receptacle 24 is formed with a bottom hem 27 and is provided in said hem with a reinforcing bar element 28 of flexible yet relatively stiff material serving to strengthen the forward edge of the receptacle. The respective side portions of the bottom wall 25 are formed with slits 29, 29 and the bottom hem 27 is extended upwardly adjacent the outside surfaces of the forward portions of the respective side walls 26, 26, to define retaining sleeves 30, 30 in which the forward end portions of the arms 16, 16 are respectively received.

The top edges of the side walls 26, 26 are reinforced by a channel-shaped strip 32 of flexible sheet material receiving said top edges and being coextensive therewith around the rear of the handle member 12.

The lower portion of the handle member 12 is formed with an aperture 33, and a headed fastener 34 extends through said aperture and through the upper marginal portion of the merging rear section 35 of the side walls 26, 26, said fasteners 34 being of any suitable type, for example, of the well known type having a pair of bendable flat retaining tongues which may be bent in opposite directions, in the manner illustrated in Figures 4 and 5 to detachably secure the rear wall portion 35 of the receptacle 24 to the handle 12.

The receptacle 24 is preferably made of a single sheet of flexible material, and therefore, the receptacle is formed at its rear portion with the pleats 36, 36 which provide an accurate fit of the receptacle with the lower portion of handle 12 and the outwardly diverging supporting arms 16, 16.

When the dust pan device is not in use, it may be mounted on a broomstick handle 13 in the manner illustrated in Figure 2, with the arms 21 in depending positions, extending substantially parallel to the handle 12, and with the spring clip 17 engaged in the upper notches 18 and lockingly held against the upper locking lugs 19, 19. As shown in Figure 2, the link members 21 will be disposed in depending positions parallel to the handle 12 and the arms 16, 16 will be likewise disposed in positions parallel to the handle 12. The device will thus be in a relatively compact position and will not interfere with normal use of the broom.

When the dust pan is to be used, it is disengaged from the broom handle 13 and the spring clip 17 is disengaged from the notches 18 and engaged with the lower portion of the handle 12 subjacent to the lugs 23, the arms of the spring clip being received in the lower locking notches 22. This unfolds the receptacle 24 and provides the positions of the various elements thereof illustrated in Figures 1, 3, 4 and 5. The device may then be employed in the manner of a conventional dust pan, the user holding the device by the handle grip portion 14.

When the use of the dust pan device is no longer required, it may be easily folded up by disengaging the spring clip 17 from the lower notches 22 and engaging said spring clip with the upper notches 18, thereby folding up the receptacle 24, and allowing the folded device to be again engaged on the broomstick handle 13 in the manner illustrated in Figure 2.

While a specific embodiment of an improved foldable dust pan attachment for a broom has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A foldable dust pan attachment for a broom comprising an elongated concave handle shaped to fit on a broom handle, a pair of outwardly diverging rigid arms pivoted to the lower end of said concave handle, a U-shaped spring clip lockingly engageable on said concave handle and adapted to clampingly embrace a broom handle engaged by said concave handle, respective link bars connecting said spring clip to the intermediate portions of said rigid arms, and a receptacle of flexible material secured on said rigid arms and the lower portion of said concave handle and extending beneath said arms and around said lower portion of the concave handle.

2. A foldable dust pan attachment for a broom comprising an elongated concave handle shaped to fit on a broom handle, a pair of outwardly diverging rigid arms pivoted to the lower end of said concave handle, a U-shaped spring clip lockingly engageable on said concave handle and adapted to clampingly embrace a broom handle engaged by said concave handle, respective link bars connecting said spring clip to the intermediate portions of said rigid arms, and a receptacle of flexible material secured on said rigid arms and the lower portion of said concave handle and extending beneath said arms and around said lower portion of the concave handle, said receptacle comprising a triangular bottom wall and generally triangular side walls rising from the side margins of said bottom wall, said side walls increasing in height from the end margin of said bottom wall remote from the apex margin thereof to the apex margin of said bottom wall and merging behind the lower portion of the handle, and a fastener connecting the upper merging portion of said side walls to said concave handle.

3. A foldable dust pan attachment for a broom comprising an elongated concave handle shaped to fit on a broom handle, a pair of outwardly diverging rigid arms pivoted to the lower end of said concave handle, a U-shaped spring clip lockingly engageable on said concave handle and adapted to clampingly embrace a broom handle engaged by said concave handle, respective link bars connecting said spring clip to the intermediate portions of said rigid arms, and a receptacle of flexible sheet material secured on said rigid arms and the lower portion of said concave handle and extending beneath said arms and around said lower portion of the concave handle, said receptacle comprising a triangular bottom wall and generally triangular side walls rising from the side margins of said bottom wall, said side walls increasing in height from the end margin of said bottom wall remote from the apex margin thereof to the apex margin of said bottom wall and merging behind the lower portion of said concave handle, and a fastener connecting the upper merging portion of said side walls to said concave handle, the concave handle being formed at its lower portion with lugs projecting from its side edges located to at times lockingly engage said spring clip and to hold the receptacle in a spread-out condition, and being further formed with lugs at its side edges located at a substantial distance above said first-named lugs to at other times lockingly engage said spring clip and to hold said receptacle in a folded condition.

References Cited in the file of this patent
UNITED STATES PATENTS

| | | |
|---|---|---|
| 518,273 | Powers | Apr. 17, 1894 |
| 802,634 | Greer | Oct. 24, 1905 |
| 926,927 | Devol | July 6, 1909 |
| 1,424,761 | Hall | Aug. 8, 1922 |